United States Patent

Nerwin

[15] 3,648,582
[45] Mar. 14, 1972

[54] CAMERA
[72] Inventor: Hubert Nerwin, Rochester, N.Y.
[73] Assignee: Eastman Kodak Company, Rochester, N.Y.
[22] Filed: May 29, 1969
[21] Appl. No.: 829,009

[52] U.S. Cl. ............................................95/11 R, 95/31 R
[51] Int. Cl. ........................................................G03b 19/04
[58] Field of Search ........................95/11, 31, 19, 23; 352/72

[56] References Cited

UNITED STATES PATENTS

| | | | |
|---|---|---|---|
| 2,381,033 | 8/1945 | Bolsey | 95/31 C |
| 3,138,084 | 6/1964 | Harvey | 95/31 FM |
| 684,221 | 10/1901 | Gill | 95/11 |
| 2,257,424 | 9/1941 | Meyer | 95/31 |
| 2,409,605 | 10/1946 | Bolsey | 95/31 |
| 2,911,894 | 11/1959 | Hennig et al. | 95/31 X |
| 3,247,773 | 4/1966 | Doblin et al. | 95/31 |
| 3,299,931 | 1/1967 | Kritzler | 95/31 X |
| 3,507,198 | 4/1970 | Prochnow | 95/31 |

*Primary Examiner*—John M. Horan
*Assistant Examiner*—Alan A. Mathews
*Attorney*—Robert W. Hampton and Milton S. Sales

[57] ABSTRACT

A camera body for use in connection with a film cartridge includes an open backed camera structure adapted to receive a cartridge and a strap connected at one of its ends to the camera structure for securing the camera body to the film cartridge. A film-winding knob may be attached to the camera strap to be connected to the film cartridge take-up spool for advancing film. The camera structure may be provided with a viewfinder formed by a portion of the strap which extends above the film cartridge when assembled. Alternatively, the camera housing may be provided with pivoted viewfinder frames which may be swung to storage positions behind a cartridge when not in use. The camera housing may be formed of telescoping side walls to increase the size of the exposure chamber therein.

9 Claims, 6 Drawing Figures

Patented March 14, 1972

HUBERT NERWIN
INVENTOR.

BY Milton S. Sales

Robert W Hampton

ATTORNEYS

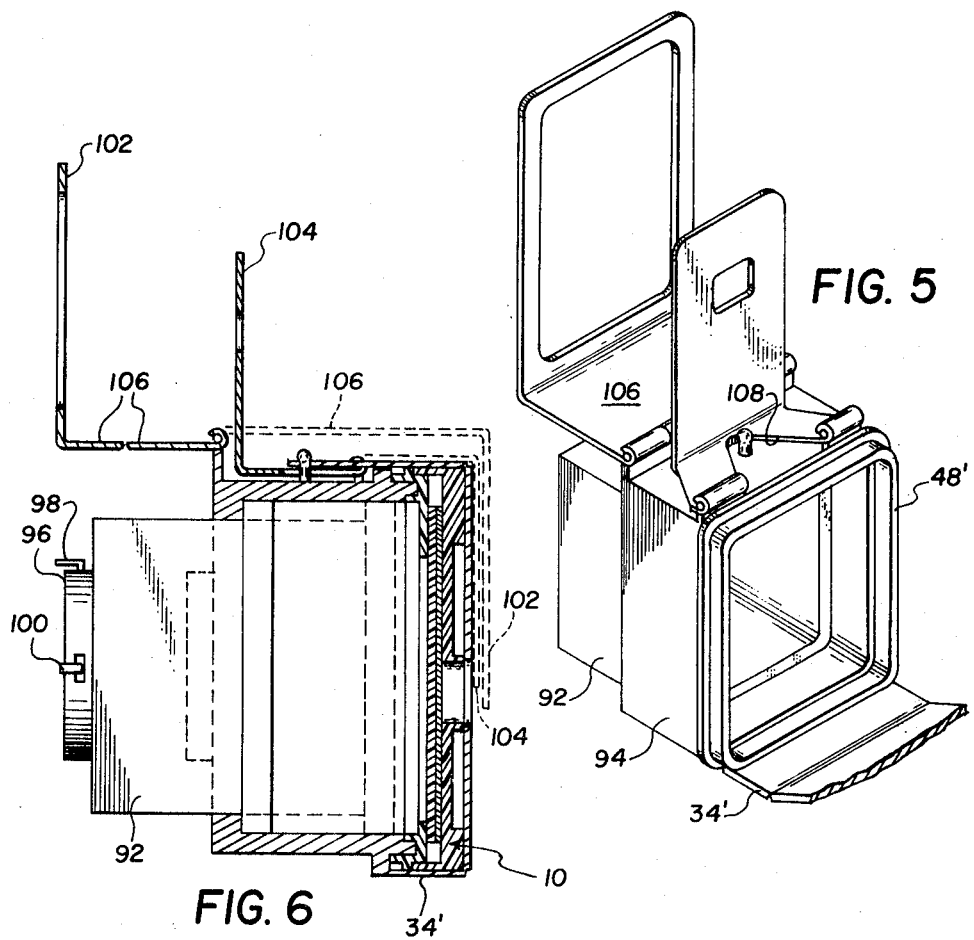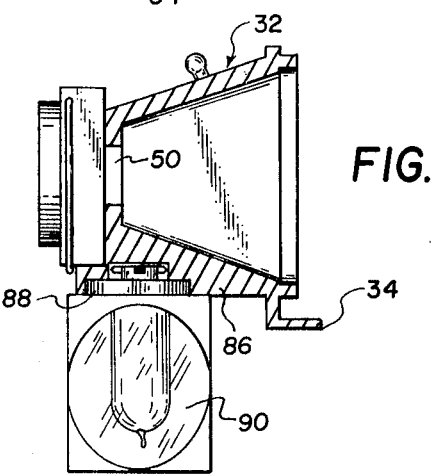

CAMERA

BACKGROUND OF THE INVENTION

1. Field of the Invention

The present invention relates to cameras, and more particularly cameras to be used with film cartridges or cassettes.

2. Description of the Prior Art

Film cartridges, for example the well known size "126" cartridge, are well known in the art. An example of such a film cartridge is found in U.S. Design Pat. No. 195,746, issued July 23, 1968 to Hubert Nerwin. A typical cartridge construction and a typical camera construction for use therewith are illustrated in U.S. Pat. No. 3,138,081, issued June 23, 1964 also to Hubert Nerwin.

Various cameras have been designed to take advantage of the construction of such film cassettes by incorporating the cassette as part of the camera housing. Such a camera is shown in U.S. Pat. No. 3,247,773, issued Apr. 26, 1966 to Jay Doblin et al. In the camera shown in the Doblin et al. patent, the cartridge is held in place on the camera housing by four lugs made of spring material and integrally formed on the camera housing. The cartridge is snapped into place by temporarily deforming the lugs, and is removed by the same process. A separate winding knob may be fitted to the film takeup spool in the cartridge.

While the Doblin et al. camera is well suited for its intended purpose, it is necessary to manufacture the camera of materials suitable for permanently attaching the cartridge-retaining lugs thereto, thus adding to the manufacturing costs. Further, the lugs themselves and the necessary manufacturing operations for securing them to the camera are relatively expensive.

SUMMARY OF THE INVENTION

It is an object of the present invention to provide a camera for use with film cartridges in which the cartridge itself forms a part of the camera housing but is readily detachable from the camera and in which a strap may be wrapped around the rear of the cartridge and fastened to the camera body to hold the cartridge in place.

It is another object of the present invention to provide a camera of the above type which is manufactured of inexpensive material wherein the camera housing and the strap are a unitary structure.

According to a preferred embodiment of the present invention, a camera body includes a housing having a front wall and bottom, side and top walls extending rearwardly from the front wall and defining an exposure chamber which is open at its rear end. A strap is connected at one of its end to the bottom wall of the camera housing and is adapted to encircle the rear of the film cartridge and to be attached at its free end to the top wall of the camera housing to secure the cartridge to the camera housing. The strap may carry a film winding knob which cooperates with the takeup spool of the film cartridge to advance the film. The camera may be provided with viewfinders which are either formed of a portion of the strap or are pivotally mounted to the camera housing to be swung to an out-of-the-way position behind an inserted film cartridge when not in use.

The invention and its objects and advantages will become more apparent in the detailed description of the preferred embodiments presented below.

BRIEF DESCRIPTION OF THE DRAWING

In the detailed description of the preferred embodiments of the invention presented below, reference is made to the accompanying drawing in which:

FIG. 4 is a fragmental partial sectional view of the camera of FIG. 2 modified to receive a flashcube;

FIG. 5 is a fragmental, perspective view of a second embodiment of the camera of the present invention; and FIG. 6 is a fragmental, sectional view of the camera shown in FIG. 5.

DESCRIPTION OF THE PREFERRED EMBODIMENTS

Because cameras are well known, the present description will be directed in particular to elements forming part of, or cooperating more directly with, apparatus in accordance with the present invention. It is to be understood that camera elements not specifically shown or described may take various forms well known to those skilled in the art.

Figure 1:
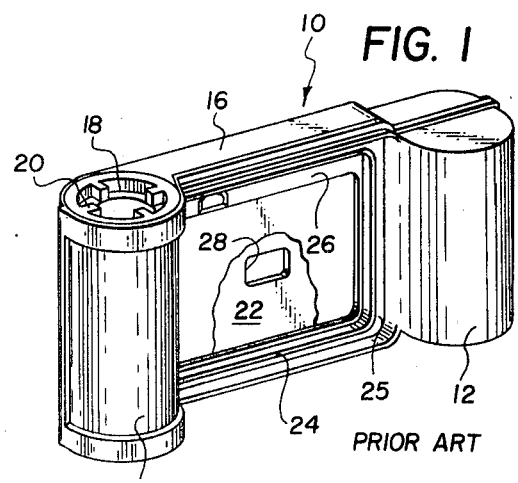
FIG. 1 is a front elevational view of a film cartridge which is well known in the prior art.

FIG. 1 shows a film cartridge 10 which is known in the prior art and is illustrated in the aforementioned Nerwin patents. Although one form of cartridge is shown, it should be understood that other forms of cartridge construction could be used with the camera of the present invention.

The cartridge comprises a hollow cylindrical compartment 12 which is closed at both ends and forms a film receptacle, a hollow cylindrical compartment 14 which is open at both ends to form a spool receptacle and a flat hollow body portion 16 interconnecting compartments 12 and 14. Compartment 12 initially contains a roll of unexposed film, not shown, having a leader which extends through body portion 16 and into engagement with an annular takeup spool 18 contained in compartment 14. Spool 18 is provided with radially inwardly extending fins 20 which are adapted to be contacted for rotating the spool in a counterclockwise direction to advance the film from the unexposed roll through body portion 16 and into compartment 14.

Body portion 16 has an exposure window 22 facing the front of the camera, window 22 being surrounded by a forwardly extending ridge 24 which forms a slot 25 with the top and bottom walls of body portion 16 and compartments 12 and 14. The terms forwardly rearwardly, upwardly, downwardly, and similar terms used herein and in the appendaged claims may be taken with reference to the camera disposed in the position shown in FIG. 3. For example, in FIG. 3 the cartridge 10 is at the rear of the camera with film chamber 12 at the left and spool chamber 14 at the right.

Exposure window 22 is formed in the front wall 26 of hollow portion 16 and defines that portion of the film surface which will be exposed to light during the picture taking process. A second window 28 is provided in the rear wall of body portion 16 to provide visual access to exposure frame numbers such as the numeral 2 shown in FIG. 3. This exposure number is printed on the paper which backs the film in the cartridge.

Figure 2:
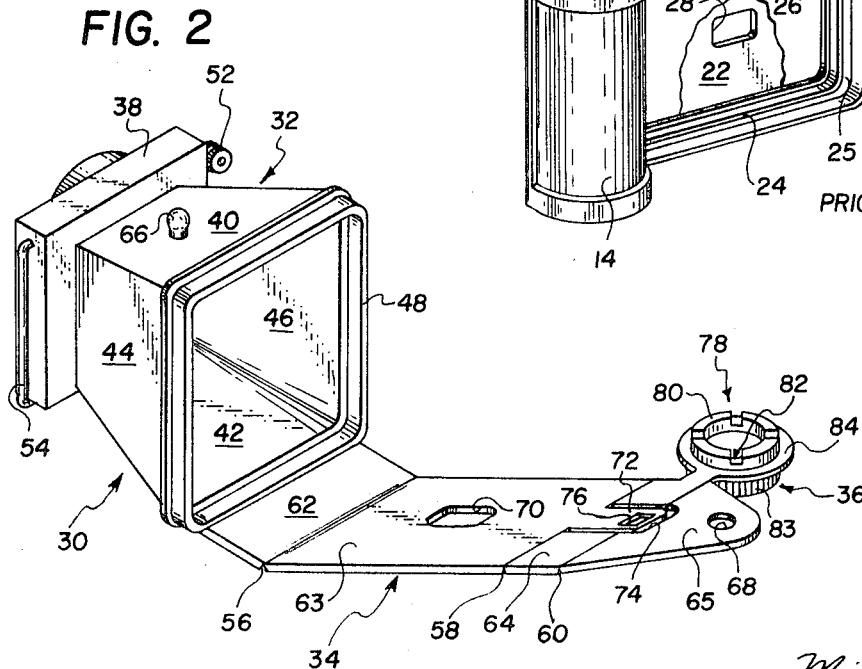
FIG. 2 is a perspective view of a camera embodying the invention.

Referring to FIG. 2, a camera structure 30 comprises an exposure chamber housing 32, a strap 34 connected at one of its ends to housing 32 and a film advance knob assembly 36 connected to strap 34. Housing 32 is formed of a front wall 38 and top, bottom, left and right walls 40, 42, 44 and 46, respectively. The walls define an exposure chamber which is slightly larger in cross-sectional area at the open rear thereof, the front being defined by wall 18. The rear ends of walls 40, 42, 44 and 46 form a rearwardly directed surface 48 which is adapted to extend into slot 25 of film cartridge 10. The mating surfaces between the camera housing and the film cartridge form a light-tight seal when assembled.

Front wall 38 has a lens opening 50 (FIG. 4) through which an image is formed at cartridge exposure window 22. Any known shutter operating mechanism may be provided in the front wall, and I have shown a lever 52 for this purpose. Further, other features common to many cameras, such as an aperture setting mechanism and an associated lever may be provided if desired. Front wall 38 also carries a pivoted frame 54 which, when raised from its storage position shown in FIG. 2 to its operative position shown in FIG. 3, forms the front portion of a sports viewfinder. Of course, other types of viewfinders may be provided, for example, frame 54 may telescope into slots formed in front wall 38 instead of being pivotally mounted.

Figure 3:
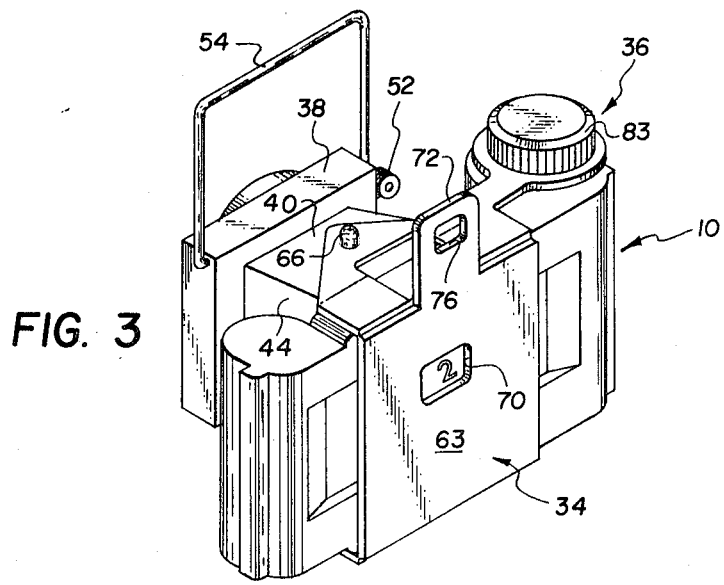
FIG. 3 is a perspective view of the camera shown in FIG. 2 with the film cartridge of FIG. 1 inserted therein.

Strap 34 is shown in FIG. 4 as integrally formed with the rearward end of bottom wall 42, but the attachment may be by any known method. Strap 34 is preferably formed of a material which is grooved at 56, 58 and 60 so that it readily bends along these grooves. The grooves divide the strap into four sections 62–65. When the camera is assembled with a film cartridge as shown in FIG. 3, section 62 underlies the cartridge bottom, section 53 lies adjacent the cartridge back wall, section 64 overlies the cartridge and section 65 extends along top wall 40 where a stud 66 on top wall 40 passes through a hole 68 in section 65 to fasten the free end of strap 38 to the camera housing. Section 63 is provided with a window 70 to which the film backing paper which underlies window 28 in cartridge 10 may be viewed.

The construction of the camera structure of the present invention permits its manufacture of relatively inexpensive materials. For instance the entire camera housing and strap assembly may be formed of a single molded plastic structure, thereby reducing manufacturing costs. Also, the camera may be formed of an even less expensive material such as cardboard to provide a "disposable" camera which might be used with only a single film cartridge and then disposed of economically.

A rear field defining frame 72 is formed in strap 34 by cutting away portions to form a slot 74 and a window 76. When section 64 of strap 34 is folded to the position shown in FIG. 3, field defining frame 72 remains upright as shown in that figure.

Winding knob assembly 36 includes a cylindrical portion 78 which is divided into cylindrical segments such as 80 by vertically extending, open ended slots such as 82. THe slots are adapted to accommodate respective fins 20 of film takeup spool 18 when film advancing assembly 36 is assembled to the film cartridge 10 as indicated in FIG. 3. A film winding knob 83 is journaled in a annular ring 84 which is molded intricly to strap 34.

When the free end of strap 34 is connected to camera housing 32 by stud 66, winding knob assembly 36 is positioned adjacent the upper end of the film takeup spool 18. The operator need only turn the knob 83 until slots 82 align with fins 20 and the springiness of connecting arm between section 64 and annular ring 84 will automatically engage slots 82 with fins 20. The film may then be advanced by counterclockwise rotation of knob 83.

After a complete roll of film has been exposed, winding knob assembly 36 can be lifted from takeup spool 18 and the free end of strap 34 can be disengaged from stud 66 and cartridge 10 removed from the back of camera housing 32.

In the embodiments shown in FIG. 4, camera housing 32 is provided with a built-up section 86 which has a flash-cube-receiving socket 88 therein. A flashcube 90 is shown mounted in the socket. Of course, suitable electrical means such as contacts, a battery and a shutter operated switch are provided to fire the flash. These features are well known in the art and, for clarity, have not been illustrated.

FIGS. 5 and 6 show another embodiment of the present invention in which the camera housing takes the form of a pair of telescoping members 92 and 94. Front telescoping member 92 carries a lens mount 96 having a shutter release lever 98 and an aperture lever 100.

Rear telescoping member 94 is formed with a strap 34' similar in construction to strap 34 of the hereinbefore described embodiments except that there is no rear field defining frame provided in strap 34'. Rear telescoping member 94 has a rearwardly facing surface 48' similar to surface 48 of FIG. 2.

A pair of pivotally mounted field defining plates or frames 102 and 104 are intricly secured to rear telescoping member 94. The upstanding frames 102 and 104 are connected to plates or legs 106 and 108, respectively, legs 106 and 108 being of sufficient length so that the field defining frames may be pivoted to the position shown in FIG. 6 in dotted lines while a cartridge is connected to the camera structure.

The invention has been described in detail with particular reference to a preferred embodiment thereof, but it will be understood that variations and modifications can be effected within the spirit and scope of the invention.

I claim:

1. A camera structure for use in connection with a film cartridge of the type having an exposure opening and a slot surrounding the exposure opening, said camera structure comprising:
   a. wall means having rear edges and defining an open-backed chamber;
   b. a plane surface defined by said rear edges of said wall means adapted to mate in light-tight relationship with the film cartridge slot; and
   c. releasable strap means connected to said wall means and adapted to be wrapped about the film cartridge for securing the film cartridge to said camera structure.

2. A camera structure as defined in claim 1 wherein said strap means and said wall means are a unitary structure.

3. A camera structure as defined in claim 1 wherein said strap means has a first end releasably attached to said wall means and a second end permanently attached to said wall means.

4. A camera structure as defined in claim 1 wherein said strap means comprises a strap attached at one end to said wall means, said strap being hinged to bend about the film cartridge.

5. A camera structure adapted to receive a film cartridge to form a closed chamber, said camera body comprising:
   a. a front wall;
   b. top and bottom walls connected to said front wall;
   c. a pair of side walls, each connected to said front, top and bottom walls and defining with said top and bottom walls an opening opposite said front wall for receiving the film cartridge in a light-tight relationship;
   d. latching means including a strap extending from one of said top, bottom and side walls and having a free end, said strap being adapted to be wrapped around the film cartridge; and
   e. means for securing said free end of said strap to the wall opposite said one wall, whereby said strap securely holds the film cartridge to said camera structure.

6. A camera as defined in claim 5 wherein said strap comprises an eye window frame which forms a part of a viewfinder for the camera body.

7. A camera structure a s defined in claim 5 further comprising a viewfinder including a first plate which defines an opening through which a scene may be viewed and a second plate connected to said first plate at an angle thereto, said second plate pivotally connected to one of said walls for movement between an active position wherein said first plate extends away from said camera structure and a storage position wherein said first plate assumes a position behind the camera structure.

8. A camera structure as defined in claim 5 further comprising a viewfinder including a first plate which defines an opening through which a scene may be viewed and a second plate connected to said first plate at an angle thereto, said second plate being pivotally connected to one of said walls for movement between an operative position wherein said first plate extends away from said camera structure and a storage position wherein said first plate assumes a position behind the camera structure, said second plate being of sufficient length to extend beyond the rear of a received film cartridge when in its storage position.

9. A camera structure as defined in claim 5 further comprising a film winding knob assembly connected to said strap and adapted to mate with the film cartridge for advancing film in the film cartridge.

* * * * *